United States Patent
Hattori

(10) Patent No.: US 6,391,508 B2
(45) Date of Patent: May 21, 2002

(54) TONER AND TWO-COMPONENT DEVELOPER FOR ELECTROSTATIC IMAGE DEVELOPMENT

(75) Inventor: Kazuyoshi Hattori, Shizuoka (JP)

(73) Assignee: Tomoegawa Paper Co., Ltd., Tokyo (JP)

( * ) Notice: Subject to any disclaimer, the term of this patent is extended or adjusted under 35 U.S.C. 154(b) by 0 days.

(21) Appl. No.: 09/891,391

(22) Filed: Jun. 27, 2001

(30) Foreign Application Priority Data

Jul. 3, 2000 (JP) ........................................ 2000-201521

(51) Int. Cl.$^7$ ................................................. G03G 9/08
(52) U.S. Cl. ................................. 430/108.6; 430/108.3
(58) Field of Search ........................... 430/108.6, 108.3, 430/111.32

(56) References Cited

U.S. PATENT DOCUMENTS

| | | | | |
|---|---|---|---|---|
| 5,710,965 A | * | 1/1998 | Nozawa et al. | 430/108.3 |
| 5,827,632 A | * | 10/1998 | Inaba et al. | 430/108.6 |
| 5,965,312 A | | 10/1999 | Nakazawa et al. | |
| 5,981,131 A | * | 11/1999 | Hirama et al. | 430/108.6 |
| 6,287,546 B1 | * | 9/2001 | Reich et al. | 424/70.121 |

FOREIGN PATENT DOCUMENTS

| | | |
|---|---|---|
| JP | 59-52255 | 3/1984 |
| JP | 5-72797 | 3/1993 |
| JP | 6-271795 | 9/1994 |
| JP | 9-316314 | 12/1997 |

* cited by examiner

*Primary Examiner*—Christopher Rodee
(74) *Attorney, Agent, or Firm*—Nixon & Vanderhye

(57) ABSTRACT

The present invention relates to a toner and a two-component developer which can produce high quality images with decreasing the dependence on environment and the back ground during continuous printing of a large number of sheets. The toner includes toner particles including a binder resin as a main component thereof and having particle surfaces deposited with titanium oxide particles, the surfaces of which are treated with at least isobutyl trimethoxy silane and trimethyl siloxysilicate. The two-component developer includes the toner and a carrier including core particles, the surfaces of which are coated with a resin coating agent including 5 to 20 percent by weight of carbon black, relative to the total weight of the resin coating agent.

8 Claims, No Drawings

TONER AND TWO-COMPONENT DEVELOPER FOR ELECTROSTATIC IMAGE DEVELOPMENT

BACKGROUND OF THE INVENTION

1. Field of the Invention

The present invention relates to a toner and a two-component developer for electrostatic image development which are employed in electrophotographic image production methods.

2. Description of the Related Art

Conventionally, toners for two-component developers are prepared by mixing binder resins, such as polyester resin and/or styrene/acrylate copolymer, as the main component of the toner, and a colorant, such as carbon black, heat melting, kneading, pulverizing, and classifying the toner particles.

When polyester resin having itself a strong negative charge property is used as the binder resin, and the obtained toner is used for a negatively charged toner, fundamental problems tend to occur. For example, the triboelectric charge property of the toner tends to gradually increase during continuous copying of a large number of sheets and to increase at low temperature and low humidity, and the image density of produced images tends to decrease, thereby adversely affecting badly on the produced images.

Moreover, since developers used in copying machines which operate at medium or greater printing speed (corresponding to 40 sheets or more of A4 size paper in a lateral direction per minute) are continuously and vigorously stirred in a developer container, the amount of charge on the developers changes with time. As a result, defects in produced images tend to easily occur, decreasing the image density and increasing the back ground. Specifically, when a two-component developer is used in the copying machine, coated films of carriers included in the two-component developer are liable to be peeled from the carriers, and the toner included in the two-component developer is liable to deposit as toner impaction on the surface of the carriers. Thereby, according to toner impaction, changes in the amount of charge, and defects in produced images described above tend to be significantly increased after continuous copying of large number of sheets.

SUMMARY OF THE INVENTION

The present invention was made in view of the circumstances described above. An object of the present invention is to provide a two-component developer including a toner having high fluidity and a carrier having reduced triboelectric properties, thereby to stabilize the amount of charge, to reduce the dependence on environment and the generation of back ground, and to produce images of high quality during continuous copying of large number of sheets.

As a result of extensive research aimed at realizing the above objects, the inventors of the present invention discovered that by using both a toner comprising toner particles including a binder resin as the main component and having particle surfaces deposited with titanium oxide particles, the surfaces of which are treated with at least isobutyl trimethoxy silane and trimethyl siloxysilicate, and a carrier having core particles, the surfaces of which are coated with a resin coating agent including 5 to 20 percent by weight of carbon black, relative to the total weight of the resin coating agent, the amount of charge is stabilized and high quality images can be produced during continuous printing of a large number of sheets.

The present invention provides a toner for electrostatic image development, comprising toner particles including a binder resin as a main component thereof and having particle surfaces deposited with titanium oxide particles, the surfaces of which are treated with at least isobutyl trimethoxy silane and trimethyl siloxysilicate. The amount of the titanium oxide particles deposited on the surface of the toner particle may be 0.05 to 0.8 percent by weight, relative to the weight of the toner particles. The mean primary particle diameter of the titanium oxide particles may be no more than 0.05 $\mu$m. The binder resin may be polyester resin. The toner particles may be negatively charged.

The present invention also provides a two-component developer, comprising the toner and a carrier including core particles, the surfaces of which are coated with a resin coating agent including 5 to 20 percent by weight of carbon black, relative to the total weight of the resin coating agent. The binder resin of the coating agent may be acrylate resin. The core particle may be magnetite.

DETAILED DESCRIPTION OF THE INVENTION

In the following, an embodiment according to the present invention will be specifically explained.

A toner for electrostatic image development includes toner particles including a binder resin as a main component thereof and having particle surfaces deposited with titanium oxide particles, the surfaces of which are treated with at least isobutyl trimethoxy silane and trimethyl siloxysilicate. By depositing the titanium oxide particles, the surfaces of which are treated with isobutyl trimethoxy silane and trimethyl siloxysilicate, on the toner particle surfaces, the fluidity of the toner particles is increased, and the amount of charge of the toner particles can be controlled. The amount of titanium oxide particles deposited on the surface of the toner particle is preferably 0.05 to 0.8 percent by weight, relative to the weight of the toner particles. When the amount of the titanium oxide particles is under 0.05 percent by weight, the amount of charge of the toner particle tends to be unstable according to environmental fluctuations. When the amount of the titanium oxide particles is over 0.8 percent by weight, the back ground tends to increase. The volume average particle diameter of the toner particles is preferably 7.5 to 12 $\mu$m.

Although various silane coupling agents are generally used as finishing agents for the titanium oxide particles, a coupling agent including both isobutyl trimethoxy silane and trimethyl siloxysilicate is used for surface treatment of the titanium oxide particles in the present invention. By depositing the titanium oxide particles treated with the coupling agent on the surface of the toner particle, the amount of charge of the toner particle can be prevented from becoming unstable. When a finishing agent which does not include trimethoxy silane and trimethyl siloxysilicate is used for surface treatment of the titanium oxide particles, the amount of charge of the toner particle tends to be unstable. Thereby, the amount of charge of the toner particles tend to decrease in high temperature and high humidity environments, and tends to increase in low temperature and low humidity environments. Thus, the coupling agent used for surface treatment of the titanium oxide particles is required to include isobutyl trimethoxy silane and trimethyl siloxysilicate.

The mean primary particle diameter of the titanium oxide particles is preferably no more than 0.05 $\mu$m, and is more preferably 0.01 to 0.04 $\mu$m. The mean primary particle diameter of the titanium oxide particles refers to the mean particle diameter of the titanium oxide particles, the surfaces of which are not yet treated with a coupling agent which includes isobutyl trimethoxy silane and trimethyl siloxysilicate. When the mean primary particle diameter is over 0.05 μm, it tends to be difficult to increase the fluidity of the toner.

The toner particle includes at least a binder resin and a colorant. Moreover, the toner particle may include anti-offset agents such as polypropylene and/or polyethylene, charge control agents, and/or releasing agents, if necessary. The toner particle is produced by a heat melting, kneading, and pulverizing method, or by a polymerization method.

Specific examples of the binder resin include homopolymers of a styrene compound such as styrene, α-methylstyrene, or chlorstyrene, an acrylate such as methyl acrylate, ethyl acrylate, propyl acrylate, butyl acrylate, octyl acrylate, or alkyl acrylate, a methacrylate such as methyl methacrylate, ethyl methacrylate, propyl methacrylate, butyl methacrylate, octyl methacrylate, stearyl methacrylate, glycidyl methacrylate, or alkyl methacrylate, acrylonitrile, maleic acid, maleate, a vinyl compound such as vinyl chloride, vinyl acetate, vinyl benzoate, vinyl methylketone, vinyl hexylketone, vinyl methylether, vinyl ethylether, or vinyl isobutylether, copolymers thereof, epoxy resin, polyester resin, polyurethane resin, and the like. Among these binder resins described above, polyester resin having itself a strong negative charge property is preferably used in the present invention.

The polyester resin is prepared by polycondensation of polycarboxylic acid and polyalcohol. Specific examples of polycarboxylic acid include aliphatic dibasic acids such as malonic acid, succinic acid, glutaric acid, adipic acid, azelaic acid, sebacic acid, and hexahydrophtalic anhydride; aliphatic unsaturated dibasic acids such as maleic acid, maleic anhydride, fumaric acid, itaconic acid, and citraconic acid; aromatic dibasic acids such as phthalic anhydride, terephthalic acid, and isophthalic acid; tribasic acids such as trimellitic acid; tetrabasic acids such as 1,2,7,8-octane-tetracarboxylic acid; and lower alkyl esters thereof.

Specific examples of polyalcohol include diols such as ethylene glycol, 1,2-propylene glycol, 1,3- propylene glycol, 1,3- butylene glycol, 1,4- butylene glycol, 1,6-hexane diol, neopentyl glycol, diethylene glycol, dipropylene glycol, hydrogenated bisphenol A, bisphenol A ethylene oxide addition product, and bisphenol A propylene oxide addition product; and triols such as glycerin, trimethylolpropane, and trimethylolethane.

The polyester resin can be prepared by the conventional high temperature polycondensation method or a conventional solution polycondensation method.

Moreover, the polyester resin may be a denaturated polyester resin such as urethane cross-linked polyester resin.

The specific examples of the colorant include carbon black generally used for toners, quinacridone pigment, azo type pigment, naphthol type pigment, copper phthalocyanine blue, benzidine yellow, benzimidazolone aniline blue, chalco-oil blue, chrome yellow, ultramarine blue, Du Pont Oil Red, quinoline yellow, methylene blue chloride, malachite green oxalate, lamp black, rose bengal, mixtures thereof, and the like.

The colorant is included in the toner particles at a ratio sufficient to produce visible images at satisfactory density. The weight ratio of the colorant included in the toner particles is preferably 0.1 to 20 percent by weight, and is more preferably 1 to 10 percent by weight, relative to the weight of the toner particles.

The toner particles may suitably include positive charge control agents and/or negative charge control agents.

Specific examples of the positive charge control agent include a quaternary ammonium salt such as Bontron P-51 (which is a trade name and is manufactured by Orient Chemical Industries, LTD.), azine compounds such as Bontron N-01, Bontron N-02, Bontron N-03, Bontron N-04, Bontron N-05, Bontron N-07, and Bontron N-09, Bontron N-11 (which are trade names and are manufactured by Orient Chemical Industries, LTD.), nigrosin type dye such as Oil Black BS (which is a trade name and is manufactured by Orient Chemical Industries, LTD.), and polyaniline type resin such as Bontron AFP-B (which is a trade name and is manufactured by Orient Chemical Industries, LTD.).

Specific examples of the negative charge control agent include metal complex azo dyes such as Bontron S-31, Bontron S-32, and Bontron S-34 (which are trade names and are manufactured by Orient Chemical Industries, LTD.), metal complex compounds of salicylic acid such as Bontron E-82 and Bontron E-84 (which are trade names and are manufactured by Orient Chemical Industries, LTD.), resin type charge control agent such as FCA1001N (which is a trade name and is manufactured by FUJIKURA KASEI CO., LTD), and a boron compound such as LR-147 (which is a trade name and is manufactured by Japan Carlit CO., LTD).

The positive charge control agent and the negative charge control agent can be suitably combined, and one or more kinds of the positive charge control agent and/or the negative charge control agent can be respectively used in accordance with the required properties of the toner.

The amount of the positive charge control agent and the negative charge control agent added to the toner particle is preferably 0.2 to 5 weight parts, relative to 100 weight parts of the binder resin. When the amount of the positive charge control agent and the negative charge control agent is under 0.2 weight parts, the distribution of the amount of charge of the toner tends to be broad, thereby it becomes difficult to produce images at adequate density and the degree of back ground increases. When the amount of the positive charge control agent and the negative charge control agent is over 5 weight parts, the amount of charge of the toner particle tends to increase, thereby the back ground increases.

When the polyester resin is used as the binder resin, the metal complex azo dye is preferably used to obtain the suitable negative charge amount.

The toner particle may include releasing agents. Specific examples of the releasing agent include long chain fatty acids such as stearic acid, esters, amides, and metallic salts thereof, low molecular weight polypropylene wax, low molecular weight polyethylene wax, paraffin wax, and natural waxes such as carnauba wax, and candelilla wax.

The surface of the toner particle may be deposited with external addition agents in addition to the titanium oxide particles described above. Specific examples of the external addition agent include fluidity improvers such as silica and alumina, and abrasives such as strontium titanate and cerium oxide.

In order to deposit the titanium oxide particles and the other external addition agent on the surface of the toner particle, a mixing machine having stirring vanes, such as a Super Mixer or a Henschel Mixer, can be used.

The toner can be produced by the following procedure. First, components of the toner particles including the binder resin, the colorant, and other components such as the positive charge control agent and/or the negative charge control agent, are mixed by stirring, and are then heat melted and kneaded. After cooling, the resultant material is pulverized and classified, and then the titanium oxide particles, the surfaces of which are treated with at least isobutyl trimethoxy silane and trimethyl siloxysilicate, are deposited on the surfaces of the toner particles by using the mixing machine. At this time, the other external addition agents may also be deposited on the surface of the toner particles together with titanium oxide particles, as necessary. The amount of titanium oxide particles deposited on the surface of the toner particle is preferably 0.05 to 0.8 percent by weight, relative to the weight of the toner particle. The titanium oxide particles treated with at least isobutyl trimethoxy silane and trimethyl siloxysilicate have a mean primary particle diameter of 0.05 μm or less. The compounding ratio of isobutyl trimethoxy silane relative to the total weight of isobutyl trimethoxy silane and trimethyl siloxysilicate is preferably 10 to 90 percent by weight, and is more preferably 40 to 60 percent by weight.

Alternatively, the toner particles can be produced by a polymerization method.

As mentioned above, since the toner includes the toner particles having a binder resin as a main component thereof and having the particle surfaces deposited with the titanium oxide particles, the surfaces of which are treated with at least isobutyl trimethoxy silane and trimethyl siloxysilicate, the toner particles have high fluidity and can yield various effects such as improvement in the quality of produced images and decrease of dependence on environment and the back ground.

A two-component developer includes the toner described above and a carrier including core particles, the surfaces of which are coated with a resin coating agent including 5 to 20 percent by weight of carbon black, relative to the total weight of the resin coating agent. Since the two-component developer includes the toner including the toner particles having the surfaces deposited with the titanium oxide particles, the surfaces of which are treated with isobutyl trimethoxy silane and trimethyl siloxysilicate, the amount of charge of the carrier included in the two-component developer is stabilized by the titanium oxide particles. Since the surfaces of the core particles are coated with the resin coating agent including 5 to 20 percent by weight of carbon black, the amount of charge of the surfaces of the carrier particles are lowered, and the amount of charge of the carrier particles is relatively prevented from decreasing, even if the surfaces coated with the resin coating agent are peeled from the core particles, in comparison with a carrier whose core particles are coated with the resin coating agent not including carbon black.

Specific examples of the resin coating agent include fluororesin, acrylate resin, styrene resin, styrene acryl copolymer, silicone resin, silicone graft resin, urethane resin, polyester resin, polybutadiene resin, and the like. Among these, acrylate resin may be preferably used as the resin coating agent.

The resin coating agent includes carbon black. The weight ratio of carbon black is 5 to 20 percent by weight, relative to the total weight of the resin coating agent. When the weight ratio of carbon black is under 5 percent by weight, the amount of charge at the surfaces of the core particles does not tend to be reduced. When the weight ratio of carbon black is over 20 percent by weight, the amount of charge of the particles tends to be too low, thereby the back ground increases.

Specific examples of the core particle of the carrier include magnetic materials such as iron powder, magnetite, and ferrite. Among these, magnetite is preferably used as the core particle. As ferrite, a sintered mixture of $MeO-Fe_2O_3$ may be used. Specific examples of Me include Mn, Zn, Ni, Ba, Co, Cu, Li, Mg, Cr, Ca, and V. Among these, one or more can be used as Me. As magnetite, a sintered product of $Fe_3O_4$ may be used.

The volume average particle diameter of the core particles, the surfaces of which are coated with the resin coating agent, is preferably 30 to 150 μm, more preferably 30 to 100 μm.

The two-component developer can be produced by the following process. First, the resin coating agent is coated on the surfaces of the core particles of the carrier by using the mixing machine to obtain the carrier. Then, the carrier is mixed with the toner described above to obtain the two-component developer. The compounding ratio of the toner relative to the carrier is preferably 2 to 10 percent by weight, and is more preferably 2 to 6 percent by weight.

As mentioned above, since the carrier has core particles, the surfaces of which are coated with the resin coating agent including 5 to 20 percent by weight of carbon black, relative to the total weight of the resin coating agent, the triboelectric charge amount of the carrier is suppressed. Since the two-component developer includes the toner and the carrier described above, effects such as improvement of the quality of produced images and decrease of dependence on environmental and the back ground can be further promoted.

EXAMPLES

In the following, the present invention will be explained more specifically by way of examples. However, the present invention is not limited to the following examples.

In order to prepare toner particles, the following materials were mixed. 100 weight parts of polyester resin A (having a Tg of 61° C., a Mn of 4,200, a Mw of 160,000, and 14 weight percent of THF insoluble component, relative to the total weight of the polyester resin A).
2 weight parts of polypropylene wax (manufactured by SANYO CHEMICAL INDUSTRIES, LTD. under the trade name Viscol 330P).
6 weight parts of carbon black (manufactured by Cabot Corporation. under the trade name Black Pearls 430).
1 weight part of charge control agent (manufactured by Orient Chemical Industries, LTD. under the trade name Bontron S-34).

Then, the obtained mixture was heated, melted, and kneaded by using a biaxial kneader, and was pulverized by using a jet mill pulverizer. Then, the pulverized material was classified by using an air classifier to obtain toner particles having a volume average particle diameter of 8.5 μm.

Example 1

0.7 percent by weight of silica (manufactured by Nippon Aerosil Co., LTD under the trade name R972) and 0.2 percent by weight of the titanium oxide particles having the surfaces treated with isobutyl trimethoxy silane and trimethyl siloxysilicate and having a mean primary particle diameter of 0.02 μm, relative to the total weight of the toner particles, were added into a Henschel mixer, and were mixed for 5 minutes while rotating stirring vanes of the Henschel mixer at a peripheral velocity of 30 m/s, to obtain Toner A.

Then, an acrylate type resin coating agent including 10 percent by weight of carbon black, relative to the total weight of the acrylate type resin coating agent, was coated on the surface of core particles made of magnetite, to obtain Carrier A. 100 weight parts of Carrier A and 4 weight parts of Toner A were mixed to obtain Developer A.

Example 2

Toner B was prepared in a manner similar to that of Example 1, except that the mean primary particle diameter of the titanium oxide particles used was 0.04 μm. Then, Toner B and Carrier A were mixed in a manner similar to that of Example 1, to obtain Developer B.

Example 3

Toner C was prepared in a manner similar to that of Example 1, except that the amount of the titanium oxide particles used was 0.1 percent by weight relative to the total weight of the toner particles. Then, Toner C and Carrier A were mixed in a manner similar to that of Example 1, to obtain Developer C.

Example 4

Toner D was prepared in a manner similar to that of Example 1, except that the amount of the titanium oxide particles used was 0.6 percent by weight, relative to the total weight of the toner particles. Then, Toner D and Carrier A were mixed in a manner similar to that of Example 1, to obtain Developer D.

Example 5

Developer E was prepared in a manner similar to that of Example 1, except that Carrier B, which had core particles coated with an acrylate type resin coating agent including 5 percent by weight of carbon black, relative to the total weight of the acrylate type resin coating agent, was used instead of Carrier A.

Example 6

Developer F was prepared in a manner similar to that of Example 1, except that Carrier C, which had core particles coated with an acrylate type resin coating agent including 15 percent by weight of carbon black, relative to the total weight of the acrylate type resin coating agent, was used instead of Carrier A.

Comparative Example 1

Developer G was prepared in a manner similar to that of Example 1, except that the titanium oxide particles were not used.

Comparative Example 2

Developer H was prepared in a manner similar to that of Example 1, except that the titanium oxide particles were treated only with isobutyl trimethoxy silane.

Comparative Example 3

Developer I was prepared in a manner similar to that of Example 1, except that the titanium oxide particles were treated only with trimethyl siloxysilicate.

Comparative Example 4

Developer J was prepared in a manner similar to that of Example 1, except that Carrier D, in which core particles were coated with an acrylate type resin coating agent which did not include carbon black, was used instead of Carrier A.

Comparative Example 5

Developer K was prepared in a manner similar to that of Example 1, except that Carrier E, in which core particles were coated with an acrylate type resin coating agent including 30 percent by weight of carbon black, relative to the total weight of the acrylate type resin coating agent, was used instead of Carrier A.

The components included in Developers A to K are respectively shown in Table 1.

TABLE 1

| | | | Titanium oxide particles | | | Carrier |
| --- | --- | --- | --- | --- | --- | --- |
| | | Developer | Particle Diameter (μm) | Weight ratio of titanium oxide particles added. (% by weight) | Kind of finishing agent for surface treatment of titanium oxide particles | Weight ratio of carbon black added. (% by weight) |
| Example | 1 | A | 0.02 | 0.2 | I + T | 10 |
| | 2 | B | 0.04 | 0.2 | I + T | 10 |
| | 3 | C | 0.02 | 0.1 | I + T | 10 |
| | 4 | D | 0.02 | 0.6 | I + T | 10 |
| | 5 | E | 0.02 | 0.2 | I + T | 5 |
| | 6 | F | 0.02 | 0.2 | I + T | 15 |
| Comparative Example | 1 | G | — | — | — | 10 |
| | 2 | H | 0.02 | 0.2 | I | 10 |
| | 3 | I | 0.02 | 0.2 | T | 10 |
| | 4 | J | 0.02 | 0.2 | I + T | 0 |
| | 5 | K | 0.02 | 0.2 | I + T | 30 |

I = Isobutyl trimethoxy silane
T = Trimethyl siloxysilicate

Devlopers A to K described above were evaluated by the following test.

Image density, back ground, and the triboelectric charge amount of Developers A to K were measured at normal temperature and normal humidity (that is, 25° C., 55% RH), after filling Developers A to K into a negatively charged copying machine of a two-component system, which was commercially available and had a processing speed corresponding to 40 sheets of A4 size papers in a lateral direction per minute, and printing an image on a sheet at 5 percent by area, relative to the total area of the sheet. Moreover, the image density, back ground, and the triboelectric charge amount of Devlopers A to K were also measured after continuously printing 150,000 sheets.

In order to evaluate the dependence on environment of Developers A to K, the image density, back ground, and the triboelectric charge amount of Developers A to K were also measured at the low temperature and the low humidity (that is, 10° C., 20% RH), and were measured at high temperature and high humidity (that is, 30° C., 80% RH), respectively.

The triboelectric charge amount of Developers A to K (Q/M) were respectively measured by using an apparatus for measuring the blow-off triboelectric charge amount, which is manufactured by TOSHIBA CHEMICAL CORP.

The image density (ID) of an solid fill image produced by using Developers A to K were respectively measured by using a reflection densitometer manufactured by Aretag Macbeth LLC. under the trade name RD-914.

The back ground (BG) generated in an image produced by using Developers A to K were respectively evaluated by subtracting the degree (%) of white in non-image area after printing from the degree (%) of white before printing, in which the degree (%) of white was measured by means of a colormeter manufactured by Nippon Denshyoku Industries, LTD. under the trade name ZE2000.

The results of the triboelectric charge amount, the image density, and the back ground density are shown in Tables 2 to 4.

TABLE 2

| | | | Measured at normal temperature and normal humidity (25° C., 55% RH) | | | | | |
|---|---|---|---|---|---|---|---|---|
| | | | Image density (ID) | | Back ground (BG) | | Triboelectric charge amount ($\mu$C/g) | |
| | | Developer | Initial | After printing 150,000 sheets | Initial | After printing 150,000 sheets | Initial | After printing 150,000 sheets |
| Example | 1 | A | 1.43 | 1.41 | 0.21 | 0.49 | −15.8 | −16.2 |
| | 2 | B | 1.44 | 1.41 | 0.25 | 0.57 | −14.5 | −16.1 |
| | 3 | C | 1.41 | 1.39 | 0.24 | 0.62 | −16.4 | −18.0 |
| | 4 | D | 1.43 | 1.42 | 0.31 | 0.63 | −15.3 | −16.5 |
| | 5 | E | 1.40 | 1.38 | 0.28 | 0.40 | −17.4 | −20.5 |
| | 6 | F | 1.44 | 1.43 | 0.35 | 0.48 | −11.7 | −13.6 |
| Comparative Example | 1 | G | 1.37 | 1.32 | 0.32 | 0.74 | −20.5 | −23.1 |
| | 2 | H | 1.43 | 1.34 | 0.28 | 0.57 | −16.7 | −22.6 |
| | 3 | I | 1.44 | 1.41 | 0.25 | 0.61 | −15.5 | −16.8 |
| | 4 | J | 1.31 | 1.24 | 0.31 | 0.56 | −19.9 | −24.3 |
| | 5 | K | 1.44 | 1.44 | 0.68 | 0.94 | −11.3 | −10.9 |

TABLE 3

| | | | Measured at low temperature and low humidity (10° C., 20% RH) | | | | | |
|---|---|---|---|---|---|---|---|---|
| | | | Image density (ID) | | Back ground (BG) | | Triboelectric charge amount ($\mu$C/g) | |
| | | Developer | Initial | After printing 150,000 sheets | Initial | After printing 150,000 sheets | Initial | After printing 150,000 sheets |
| Example | 1 | A | 1.41 | 1.40 | 0.42 | 0.65 | −17.8 | −19.2 |
| | 2 | B | 1.42 | 1.41 | 0.49 | 0.73 | −16.5 | −18.6 |
| | 3 | C | 1.40 | 1.37 | 0.49 | 0.82 | −18.4 | −21.8 |
| | 4 | D | 1.42 | 1.40 | 0.44 | 0.59 | −17.5 | −18.3 |
| | 5 | E | 1.40 | 1.37 | 0.45 | 0.62 | −18.7 | −22.2 |
| | 6 | F | 1.43 | 1.43 | 0.41 | 0.80 | −13.4 | −15.7 |
| Comparative Example | 1 | G | 1.35 | 1.21 | 0.51 | 0.87 | −24.6 | −31.4 |
| | 2 | H | 1.40 | 1.24 | 0.34 | 0.58 | −18.8 | −27.8 |
| | 3 | I | 1.42 | 1.41 | 0.47 | 0.95 | −16.3 | −19.3 |
| | 4 | J | 1.26 | 1.18 | 0.61 | 0.86 | −22.9 | −29.8 |
| | 5 | K | 1.44 | 1.43 | 0.65 | 0.89 | −13.8 | −12.4 |

TABLE 4

| | | | Measured at high temperature and high humidity (30° C., 80% RH) | | | | | |
|---|---|---|---|---|---|---|---|---|
| | | | Image density (ID) | | Back ground (BG) | | Triboelectric charge amount ($\mu$C/g) | |
| | | Developer | Initial | After printing 150,000 sheets | Initial | After printing 150,000 sheets | Initial | After printing 150,000 sheets |
| Example | 1 | A | 1.44 | 1.43 | 0.23 | 0.33 | −11.9 | −12.1 |
| | 2 | B | 1.44 | 1.43 | 0.25 | 0.30 | −11.1 | −11.9 |
| | 3 | C | 1.43 | 1.42 | 0.27 | 0.36 | −12.4 | −12.9 |
| | 4 | D | 1.44 | 1.43 | 0.22 | 0.31 | −12.0 | −12.4 |
| | 5 | E | 1.43 | 1.43 | 0.30 | 0.44 | −13.7 | −18.6 |
| | 6 | F | 1.44 | 1.44 | 0.45 | 0.74 | −9.7 | −10.9 |
| Comparative Example | 1 | G | 1.40 | 1.39 | 0.32 | 0.51 | −11.3 | −10.7 |
| | 2 | H | 1.41 | 1.39 | 0.28 | 0.46 | −11.9 | −12.1 |
| | 3 | I | 1.44 | 1.42 | 0.47 | 1.13 | −11.5 | −10.1 |
| | 4 | J | 1.38 | 1.35 | 0.37 | 0.52 | −14.4 | −17.8 |
| | 5 | K | 1.44 | 1.44 | 0.78 | 1.20 | −8.3 | −9.7 |

As shown in Tables 2 to 4, the triboelectric charge amount of each of the Devlopers A to F was stabilized. The back ground generated in an image produced by using each of the Developers A to F was reduced. The dependence on environment of each of the Devlopers A to F was low, and the image density of an image produced by using each of the Developers A to F was sufficient. The Developers A to F could each produce high quality images even after continuously printing 150,000 sheets.

Thus, by using toner particles, the surfaces of which are deposited with the titanium oxide particles having surfaces treated with isobutyl trimethoxy silane and trimethyl siloxysilicate, high quality images can be produced even after continuously printing 150,000 sheets.

By using a resin coating agent including 5 to 20 percent by weight of carbon black, relative to the total weight of the resin coating agent, for coating the surfaces of core particles of the carrier included in a two-component developer, the effects described above are further promoted.

What is claimed is:

1. A toner for electrostatic image development, comprising toner particles including a binder resin as a main component thereof and having particle surfaces deposited with titanium oxide particles having surfaces treated with at least isobutyl trimethoxy silane and trimethyl siloxysilicate.

2. A toner for electrostatic image development according to claim 1, wherein the amount of the titanium oxide particles deposited on the surface of the toner particles is 0.05 to 0.8 percent by weight, relative to the weight of the toner particles.

3. A toner for electrostatic image development according to claim 1, wherein the mean primary particle diameter of the titanium oxide particle is no more than 0.05 $\mu$m.

4. A toner for electrostatic image development according to claim 1, wherein the binder resin is polyester resin.

5. A toner for electrostatic image development according to claim 1, wherein the toner particles are negatively charged.

6. A two-component developer, comprising a toner according to claim 1 and a carrier including core particles having surfaces coated with a resin coating agent including 5 to 20 percent by weight of carbon black, relative to the total weight of the resin coating agent.

7. A two-component developer according to claim 6, wherein the binder resin of the resin coating agent is acrylate resin.

8. A two-component developer according to claim 6, wherein the core particle of the carrier is magnetite.

* * * * *